US008376244B2

(12) United States Patent
Anderton et al.

(10) Patent No.: US 8,376,244 B2

(45) Date of Patent: Feb. 19, 2013

(54) MOBILE FLUID DISTRIBUTION SYSTEM AND METHOD

(75) Inventors: Peter W. Anderton, Peoria, IL (US); Ronald Brown, Morton, IL (US); David C. Orr, Dunlap, IL (US); Gary A. Ellertson, Pleasant Prairie, WI (US)

(73) Assignee: Caterpillar Inc., Peoria, IL (US)

( * ) Notice: Subject to any disclaimer, the term of this patent is extended or adjusted under 35 U.S.C. 154(b) by 229 days.

(21) Appl. No.: 12/472,415

(22) Filed: May 27, 2009

(65) Prior Publication Data

US 2010/0301127 A1 Dec. 2, 2010

(51) Int. Cl.

| | |
|---|---|
| ***B05B 17/04*** | (2006.01) |
| ***B05B 9/06*** | (2006.01) |
| ***B05B 1/20*** | (2006.01) |
| ***B05B 1/26*** | (2006.01) |
| ***A01G 25/09*** | (2006.01) |

(52) U.S. Cl. .......... 239/11; 239/155; 239/156; 239/162; 239/172; 239/176; 239/524

(58) Field of Classification Search .................... 239/11, 239/67, 146, 147, 155, 156, 157, 161, 162, 239/163, 164, 169, 172, 175, 176, 518, 521, 239/523, 524, 570, 571, 586, DIG. 1

See application file for complete search history.

(56) References Cited

U.S. PATENT DOCUMENTS

| | | | | |
|---|---|---|---|---|
| 622,547 | A | 4/1899 | Shedlock et al. | |
| 2,031,262 | A | 2/1936 | Hill, Jr. | |
| 3,100,083 | A | 8/1963 | Wardrup | |
| 3,344,993 | A | 10/1967 | Walder et al. | |
| 3,529,772 | A * | 9/1970 | Brodersen | 239/157 |
| 3,552,658 | A * | 1/1971 | Sons | 239/456 |
| 3,587,971 | A | 6/1971 | Ross | |
| 3,782,634 | A * | 1/1974 | Herman | 239/156 |
| 3,853,272 | A | 12/1974 | Decker et al. | |
| 4,052,003 | A | 10/1977 | Steffen | |
| 4,167,247 | A * | 9/1979 | Sons et al. | 239/455 |
| 4,274,585 | A | 6/1981 | Lestradet | |
| 4,315,317 | A | 2/1982 | Orchard et al. | |
| 4,519,542 | A | 5/1985 | Johnston | |
| 4,593,360 | A | 6/1986 | Cocks | |

(Continued)

FOREIGN PATENT DOCUMENTS

EP 0 294 952 5/1988

OTHER PUBLICATIONS

"Enviro-Spray Dust Suppression", document downloaded from the Hayden website at <http://www.hydeneng.com.au/SiteFiles/hydenegcomau/02900192A.pdf> before the filing date of this application, 12 pages.

(Continued)

*Primary Examiner* — Ryan Reis

(74) *Attorney, Agent, or Firm* — Finnegan, Henderson, Farabow, Garrett & Dunner LLP

(57) ABSTRACT

A fluid distribution system and method for mobile applications. The system includes a power source, a pump driven by the power source, and a motor driven by the pump. The system also includes a spray head with a fluid inlet passage, a fluid outlet passage, a fluid piston disposed in a chamber for controlled access between the inlet and outlet passages and defining a variable orifice, and a hydraulic cylinder controllably engaged to the orifice. The fluid piston and the hydraulic cylinder are aligned with a common longitudinal axis, and the inlet passage is offset from the axis in a direction opposed to the location of the outlet passage.

26 Claims, 7 Drawing Sheets

U.S. PATENT DOCUMENTS

| | | | | |
|---|---|---|---|---|
| 4,650,124 | A | 3/1987 | Connaughty et al. | |
| 4,676,435 | A * | 6/1987 | Nesland | 239/112 |
| 4,685,545 | A | 8/1987 | Fannin et al. | |
| 4,803,626 | A | 2/1989 | Bachman et al. | |
| 4,817,870 | A | 4/1989 | Dalton | |
| 5,004,155 | A | 4/1991 | Dashevsky | |
| 5,076,497 | A | 12/1991 | Rabitsch | |
| 5,134,961 | A | 8/1992 | Giles et al. | |
| 5,433,380 | A | 7/1995 | Hahn | |
| 5,475,614 | A | 12/1995 | Tofte et al. | |
| 5,522,543 | A | 6/1996 | Herzog | |
| 5,618,022 | A | 4/1997 | Wallace | |
| 5,911,362 | A | 6/1999 | Wood et al. | |
| 5,911,363 | A * | 6/1999 | Oligschlaeger | 239/11 |
| 5,964,410 | A | 10/1999 | Brown et al. | |
| 5,988,535 | A | 11/1999 | Kime | |
| 6,068,200 | A | 5/2000 | Kime | |
| 6,119,955 | A * | 9/2000 | Starr | 239/11 |
| 6,382,523 | B1 * | 5/2002 | Hedegard | 239/172 |
| 6,446,879 | B1 | 9/2002 | Kime | |
| 6,454,183 | B1 | 9/2002 | Hedegaard et al. | |
| 6,749,128 | B1 | 6/2004 | Oosterman | |
| 6,938,829 | B2 | 9/2005 | Doherty et al. | |
| 6,977,013 | B2 | 12/2005 | Schroeder et al. | |
| 7,108,196 | B2 | 9/2006 | Kime | |
| 7,182,278 | B2 | 2/2007 | Haviland et al. | |
| 7,213,772 | B2 | 5/2007 | Bryan et al. | |
| 7,370,818 | B2 | 5/2008 | Ward | |
| 7,896,258 | B2 * | 3/2011 | Hoisington et al. | 239/155 |
| 2006/0273189 | A1 | 12/2006 | Grimm et al. | |
| 2007/0221744 | A1 | 9/2007 | Simon et al. | |

OTHER PUBLICATIONS

"Thiess Smart Water Trucks", document downloaded from the Thiess website at <http://www.qrc.org.au/conference/_dbase_upl/Innov/SmartWaterTrucks_Thiess.pdf> before the filing date of this application, 7 pages.

"Smart Hydraulics boost truck spray time", document downloaded from the Machine Design website at <http://machinedesign.texterity.com/machinedesign/20090205/?pg=28> before the filing date of this application, 1 page.

"Water Distribution System", document downloaded from the Open Loop website at <http://openloop.net/water%20distl.html> Apr. 8, 2009, 1 page.

* cited by examiner

MOBILE FLUID DISTRIBUTION SYSTEM AND METHOD

TECHNICAL FIELD

This disclosure relates generally to a system and method for fluid distribution and, more particularly, to a system and method for controlled distribution of a fluid in a mobile environment.

BACKGROUND

Fluid distribution systems, in particular mobile fluid distribution systems, are used in a variety of applications. For example, at mining and construction sites, it is common to use mobile fluid distribution systems to spray water over routes and work areas to minimize the creation of dust during operations. A specific example might include a water truck that sprays water over roads at a mine site.

Other applications of mobile fluid distribution systems may include spraying of pesticides and herbicides, e.g., for agricultural use, disbursement of saline solutions on roads for snow and ice control, fire suppression, and the like.

For various reasons, such as cost and consistent fluid application, it is desired to maintain control of the amount and pattern of fluids being distributed, in particular with regard to maintaining a uniform and consistent application of fluid per unit of area. For example, when spraying water on mine roads, it may be desired to uniformly distribute the water over the road surface to avoid applying excess water in specific locations.

Typical fluid distribution systems spray fluids at pressures that are directly proportional to engine speeds of the mobile machines. Operators attempt to keep fluid pressure, and the resultant flow of fluids, relatively constant by maintaining constant engine speeds, at least to the extent possible. These efforts typically require operating mobile machines at reduced transmission gear ratios to maintain desired engine speeds. However, these efforts cannot be maintained, for example, when ascending or descending steep inclines, conditions which generally require changing engine speeds.

Efforts have been made to maintain fluid pressures in proportion to machine speed, i.e., ground speed, rather than engine speed. Although this has resulted in improved fluid distribution per unit area, it is still difficult to maintain precise control during various operating maneuvers, such as starting and stopping, and as operating conditions vary. Furthermore, many of these systems still distribute fluids in proportion to fluid pressure, which adds to the difficulty of consistent application per unit of area.

One example of an attempt to achieve uniform fluid application is described in U.S. Pat. No. 5,964,410 to Brown et al. (the Brown patent). Brown employs spray heads with variable orifices to attempt maintenance of constant velocities and exit flow trajectories. The spray heads are pressure controlled, however, relying on pressure of the fluid being sprayed to overcome a spring force to open the spray nozzle. Furthermore, the components that are used to control the nozzle are located in the main fluid flow chamber, and thus are susceptible to corrosion and contamination by particles and debris in the fluid. As a result, the system would still have difficulty achieving consistent application of the fluid per unit of area during various operating conditions.

The present disclosure is directed to overcoming one or more of the problems as set forth above.

SUMMARY

In one aspect of the present disclosure a fluid distribution system is disclosed. The system includes a power source, a pump driven by the power source, and a motor driven by the pump. The system also includes a spray head with a fluid inlet passage, a fluid outlet passage, a fluid piston disposed in a chamber for controlled access between the inlet and outlet passages and defining a variable orifice, and a hydraulic cylinder controllably engaged to the orifice. The fluid piston and the hydraulic cylinder are aligned with a common longitudinal axis, and the inlet passage is offset from the axis in a direction opposed to the location of the outlet passage.

In another aspect of the present disclosure a method for distributing a fluid is disclosed. The method includes determining a ground speed of a mobile machine, determining a pressure of fluid being delivered to a spray head having a variable orifice, comparing the determined pressure to a desired fluid pressure, controlling a motor to maintain the desired fluid pressure, and controlling the variable orifice as a function of the ground speed and independent of fluid pressure to maintain a desired distribution of fluid.

In yet another aspect of the present disclosure a spray head for a fluid distribution system is disclosed. The spray head includes a fluid inlet passage, a fluid outlet passage, a fluid piston disposed in a chamber for controlled access between the inlet and outlet passages and defining a variable orifice, and a hydraulic cylinder controllably engaged to the orifice. The fluid piston and the hydraulic cylinder are aligned with a common longitudinal axis, and the inlet passage is offset from the axis in a direction opposed to the location of the outlet passage.

DETAILED DESCRIPTION

Figure 1:
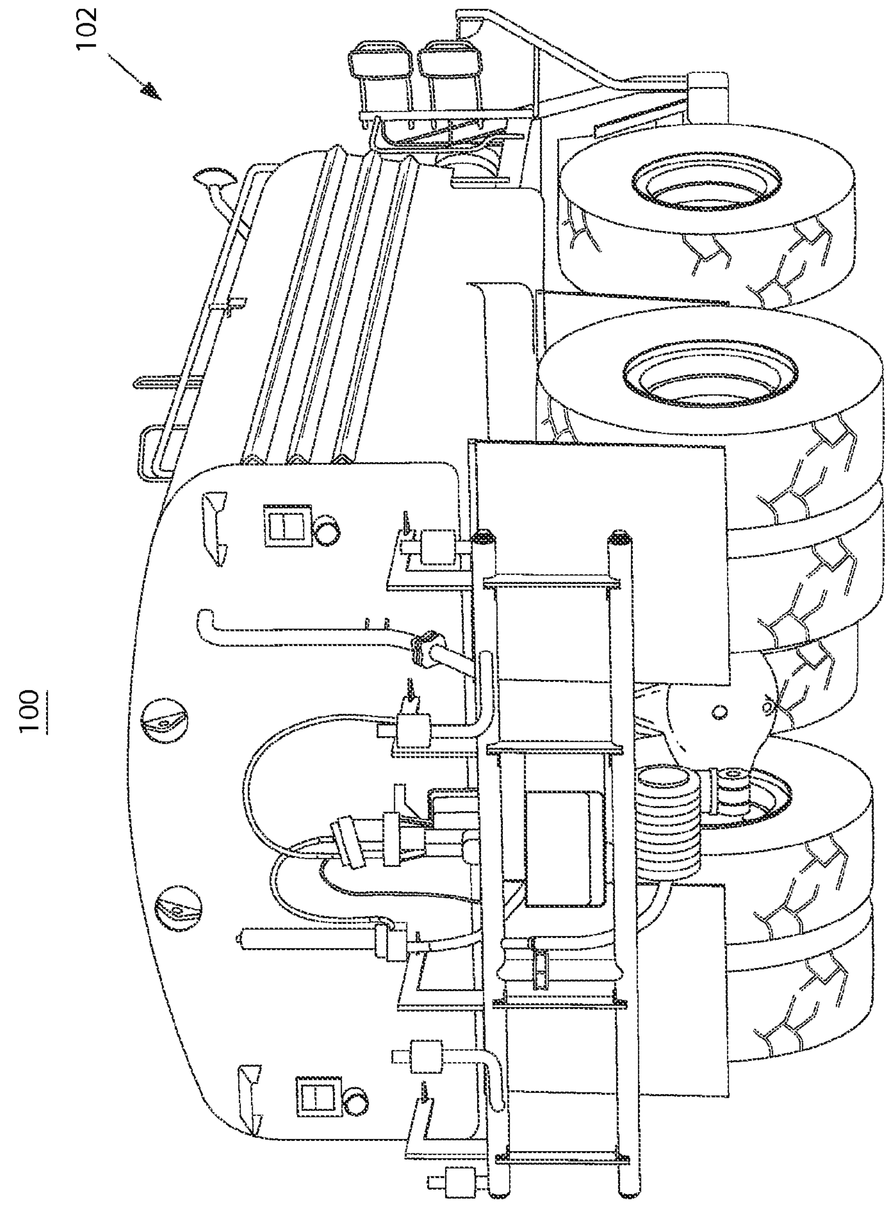
FIG. 1 is a diagrammatic illustration of a mobile machine suited for use with the present disclosure.

Referring to the drawings, a mobile fluid distribution system 100 and method for distributing fluids is shown.

Referring to FIG. 1 in particular, a mobile machine 102 suited for use for distributing fluids is depicted. The mobile machine 102 of FIG. 1 is shown as a truck, i.e., typical for use in off-highway applications, converted for use to distribute fluids. However, other types of mobile machines may be employed, for example, articulated trucks, on-highway trucks, tractor-scrapers, tractors in combination with trailers, and the like.

Although not labeled as such in FIG. 1, the mobile machine 102 is fitted with a fluid tank (element 430 in FIG. 4), and is shown with a variety of piping, hoses, pumps and valves for fluid distribution purposes. In particular, the mobile machine 102 in FIG. 1 is shown as an off-highway truck configured as a water truck for spraying water at a work site that typically generates much dust during work operations. The present disclosure, however, may also apply to other types of mobile machines set up to distribute water or other types of fluids in a wide variety of applications. For example, a tractor pulling a trailer may be used to distribute chemicals in agricultural settings, an on-highway truck may be configured to spray a saline solution on roads, runways, or parking lots to melt snow and ice, and other varieties of applications and setups may be used.

Figure 2A:
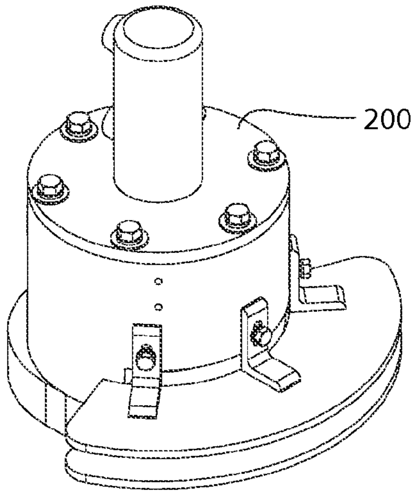
FIGS. 2A and 2B are diagrammatic views of a spray head suited for use with the present disclosure.
Figure 2B:
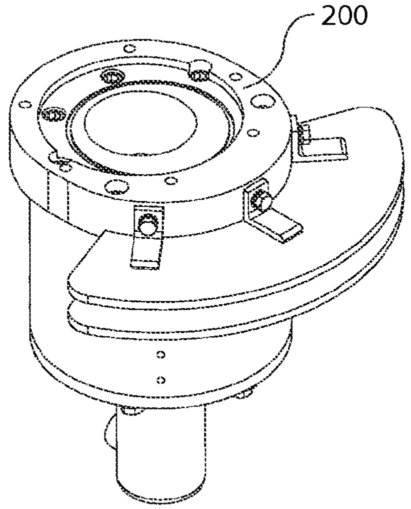

FIGS. 2A and 2B illustrate views of a spray head 200 that may be used with the present disclosure. As shown more clearly and in more detail in FIG. 3, the spray head 200 may be assembled in relation to a longitudinal axis 312 for reference purposes. For example, the spray head 200 includes a fluid inlet passage 302 and a fluid outlet passage 304. The outlet passage 304 may be located at a position offset from the longitudinal axis 312. The inlet passage 302 may be located at a position offset from the longitudinal axis 312 and in a direction opposed to the location of the outlet passage 304. The location of the inlet passage 302 relative to the location of the outlet passage 304, i.e., on opposite sides of the longitudinal axis 312, may contribute to providing a laminar flow of fluid from the spray head 200. Such laminar flow may result in a flat spray pattern having droplets of a minimal size large enough to achieve reduced atomization of the fluid. In a water truck example, this may contribute to optimal fluid control from the spray head 200 to a desired surface during mobile spraying.

A fluid piston 306 disposed in a chamber 307 of the spray head 200 defines a variable orifice 308 and may provide controlled access between the inlet passage 302 and the outlet passage 304. Controllably engaged to the orifice 308 is a hydraulic cylinder 310. More specifically, the hydraulic cylinder 310 includes a hydraulic piston 316 connected to a rod 322, which in turn is connected to the fluid piston 306. In operation, as the hydraulic piston 316 is controlled to move, i.e., linear with the longitudinal axis 312, the rod 322 moves and the fluid piston 306 subsequently moves, which results in a change in size of the orifice 308.

Figure 3:
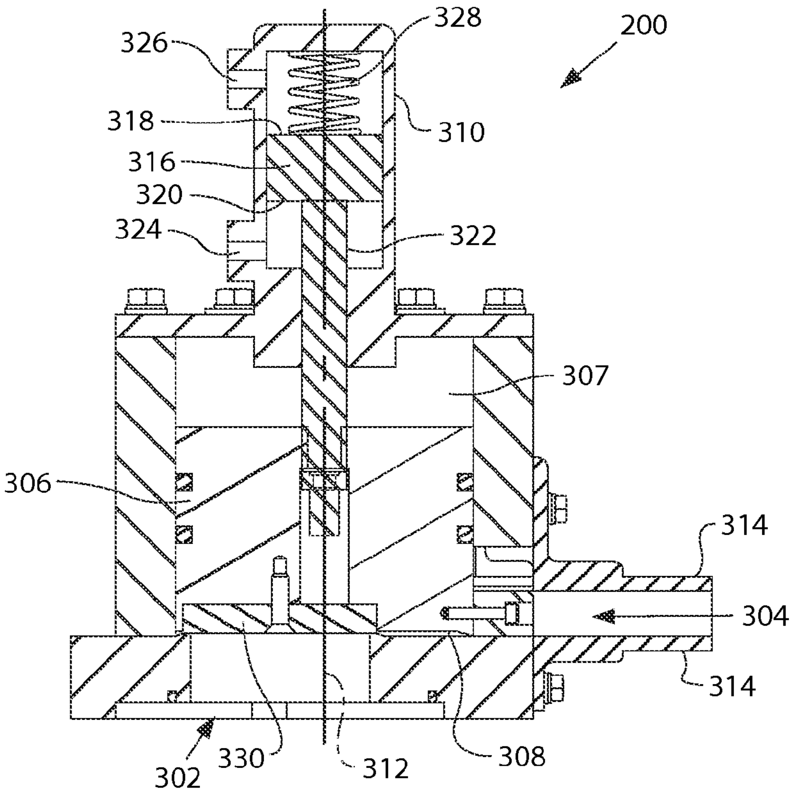
FIG. 3 is a cut-away view of the spray head of FIGS. 2A and 2B.

In the embodiment shown in FIG. 3, the hydraulic cylinder 310 is a double acting hydraulic cylinder 310. That is, the hydraulic cylinder 310 is hydraulically controlled to move in either direction. In more detail, the hydraulic piston 316 includes a head end 318 and a rod end 320. The hydraulic cylinder 310 includes a first hydraulic port 324 positioned to allow hydraulic fluid in the hydraulic cylinder 310 at the rod end 320, and a second hydraulic port 326 positioned to allow hydraulic fluid in the hydraulic cylinder 310 at the head end 318. Detailed operation of hydraulic circuits that may be used to control the spray heads 200 is described below.

The hydraulic cylinder 310 may include a spring 328 disposed in the head end 318. The spring 328 may provide additional force to hold the orifice 308 in a closed position, for example when the hydraulic circuits are shut down. The spring 328 may also be used to supplement the force applied to the head end 318 of the hydraulic cylinder 310. For example, the spring 328 may be selected having a desired compression rate (e.g., force per unit of compression). The total forces applied to the head end 318 may be from a combination of hydraulic fluid supplied to the second hydraulic port 326 and the force of the spring 328, and the total forces applied to the rod end 320 may be from a combination of hydraulic fluid supplied to the first hydraulic port 324 and pressure from fluid entering the inlet passage 302. If the fluid pressure entering the inlet passage 302 is kept fairly constant, then control of the degree of opening of the orifice 308 may be attained by varying the hydraulic fluid to the first hydraulic port 324.

It is noted that the spray head 200 may be configured for control of the fluid piston 306 by use of other configurations. For example, the hydraulic cylinder 310 may be configured without the second hydraulic port 326 and the associated hydraulic components, thus relying on hydraulic pressure on the rod end 320 and spring pressure on the head end 318.

It is further noted that the spray head 200 may be configured for control by other than a hydraulic piston 316. For example, the hydraulic cylinder 310, hydraulic piston, 316, and all associated hydraulic circuits and components could be replaced by electrical or mechanical actuators. As specific examples, the fluid piston 306 may be controlled by an electrical actuator such as a solenoid (not shown), or may be controlled by a mechanical actuator which may include any of a variety of cams, screws, levers, fulcrums, and the like (also not shown).

The hydraulic cylinder 310 may be fluidically isolated from the chamber 307, thus isolating the fluid that passes through the orifice 308 from the hydraulic fluid in the hydraulic cylinder 310. This design offers the advantage of keeping particles and contaminants away from the components in the hydraulic cylinder 310, for example when water from retaining ponds is used for dust suppression applications.

The spray head 200 may include one or more fluid deflectors 314 connected to the spray head 200 and configured to control a fluid distribution pattern from the outlet passage 304. For example, two fluid deflectors 314 are shown in FIG. 3 (and may be viewed in FIGS. 2A and 2B, although not labeled as such). The fluid deflectors 314 may be configured to control the fluid distribution pattern, for example in a laminar flow, from the outlet passage 304 in furtherance of the laminar flow control that may be provided by the above-described specific locations of the inlet and outlet passages 302,304 relative to the longitudinal axis 312.

A seal plate 330, attached to the fluid piston 306, may be used to further deflect fluid to attain a desired spray pattern, for example by designing the seal plate 330 with a desired shape and physical configuration.

Figure 4:
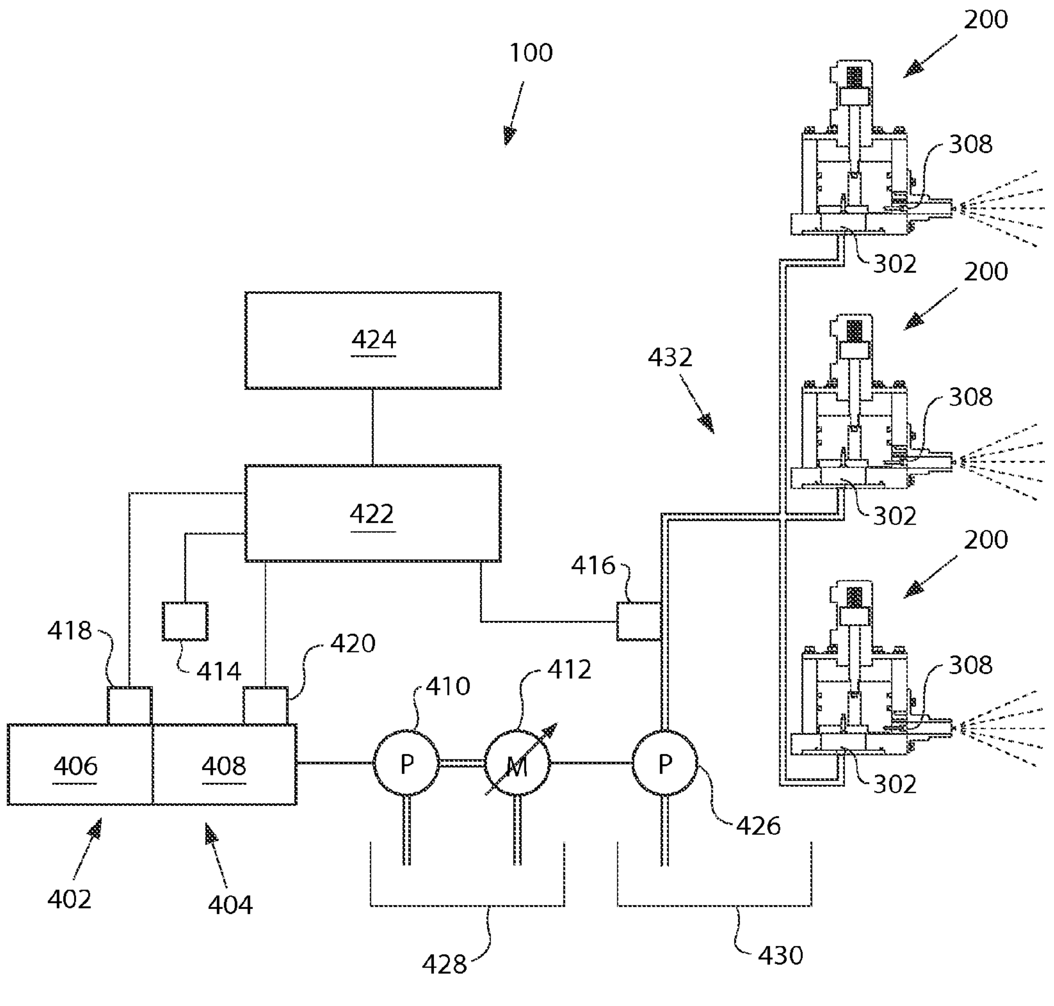
FIG. 4 is a representative block diagram of a fluid distribution system.

Referring to FIG. 4, a block diagram of a representative portion of a fluid distribution system 100 is shown. For exemplary purposes, FIG. 4 is described as applied to a mobile machine 102, i.e., an off-highway truck, set up for use as a water truck at a mining or construction site, although the fluid distribution system 100 shown in FIG. 4 could be used in other applications as noted above.

A power source 402 to supply power for the fluid distribution system 100 may also be used to supply motive power for the mobile machine 102. For example, the power source 402 may include a prime mover 404 for the mobile machine 102. The prime mover 404 may include an engine 406 drivingly connected to the mobile machine 102 and a transmission 408 driven by the engine 406. The engine 406 and transmission 408 may be chosen from among many types and configurations that are well known in the art. It is also well known to use the power supplied by prime movers 404 for other purposes in addition to providing motive power. For example, an off-highway truck, prior to being configured for water distribution applications, may have been designed to use power from the prime mover 404 for applications such as raising and lowering a truck bed.

A pump 410, driven by the power source 402, is in turn configured to drive a motor 412. The pump 410 may be driven by the engine 406 or the transmission 408 by means that are known in the art, and may be a hydraulic pump 410 as is also known in the art. The pump 410 may be configured to drive the motor 412 by well known hydraulic means. A hydraulic tank 428 may be used to supply and recover hydraulic fluid to and from the pump 410 and motor 412.

In the embodiment shown in FIG. 4, the pump 410 may be a fixed displacement type and the motor 412 may be variable displacement. For example, an off-highway truck configured for use as a water truck may have an existing fixed displacement pump 410 already in place for other purposes. Adding a variable displacement motor 412 may offer advantages in control of the fluid distribution system 100, for example by enabling control of fluid pressure to maintain the fluid at a constant desired pressure regardless of engine speed or ground speed. A fixed displacement pump 410 may still be used for applications other than fluid distribution without being affected by changes in fluid distribution parameters. For example, the pump 410 may drive the motor 412 and also drive a system for cooling brake components (not shown). The brake cooling system would not be affected by load changes from the fluid distribution system 100. In alternative embodiments, the pump 410 and motor 412 may be other combinations of fixed and variable displacement devices, for example a variable displacement pump and a fixed displacement motor.

The motor 412 is fluidly connected to one or more spray heads 200, e.g., three spray heads as shown in FIG. 4. More specifically, the motor 412 may provide hydraulic power to a fluid pump 426, which in turn delivers fluid by way of fluid lines 432 to the inlet passages 302 and through the orifices 308 of the spray heads 200. The fluid pump may obtain fluid from a fluid tank 430, for example a water tank mounted on a water truck.

Although the three spray heads 200 in FIG. 4 are shown connected by common fluid lines 432 to the fluid pump 426, each spray head 200 may be independently controllable. In addition, each spray head 200 may include an orifice 308 that is continuously variable from a fully closed position to a fully open position, as distinguished from an orifice that is capable of only being open or closed.

A ground speed sensor 414, located on the mobile machine 102, may be configured to sense a ground speed as the machine moves. The ground speed sensor 414 may be located to sense ground speed based on operation of the transmission 408, rotational movement of a ground engaging member (not shown) such as a wheel, or by some other method known in the art.

A fluid pressure sensor 416 may be located to sense pressure of fluid in fluid lines 432, or alternatively fluid pressure exiting fluid pump 426.

An engine speed sensor 418 may be located to sense the speed of the engine 406.

A transmission state sensor 420 may be located to sense the state, e.g., forward, neutral, or reverse, of the transmission 408. The transmission state sensor 420 may alternatively sense direction of motion of the mobile machine 102 to determine transmission state.

Any of the above sensors may be configured to directly sense a desired parameter, may sense one or more secondary parameters and derive a value for the desired parameter, or may determine a value for the desired parameter by some other indirect means. Operation of the above sensors for their intended purposes are well known in the art and will not be described further.

A controller 422 may receive sensed or derived signals from the ground speed sensor 414, the fluid pressure sensor 416, the engine speed sensor 418, and the transmission state sensor 420. The controller 422 may also be controllably connected to one or more of the motor 412 and the spray heads 200. For example, and as described in more detail below, the controller 422 may use information received from the ground speed sensor 414 and the fluid pressure sensor 416 to determine a desired fluid pressure to maintain, and responsively control the variable displacement of the motor 412 to maintain a constant fluid pressure. The controller 422 may also use information received from the engine speed sensor 418 for further control of the variable displacement motor 412. The controller 422 may also use the above received information to control the variable orifices 308 of the spray heads 200 to control a flow rate of the fluid being delivered to and sprayed from the spray heads 200. In one specific example, the controller 422 may determine from the transmission state sensor 420 if the mobile machine 102 is moving in reverse, and responsively shut off the fluid distribution system 100 during this condition.

An operator control device 424, located in a cab compartment (not shown) of the mobile machine 102, may provide an operator with a variety of control and display functions for the fluid distribution system 100. The operator control 424 may be of any desired configuration and may be custom designed for specific mobile machines and applications.

Figure 8:
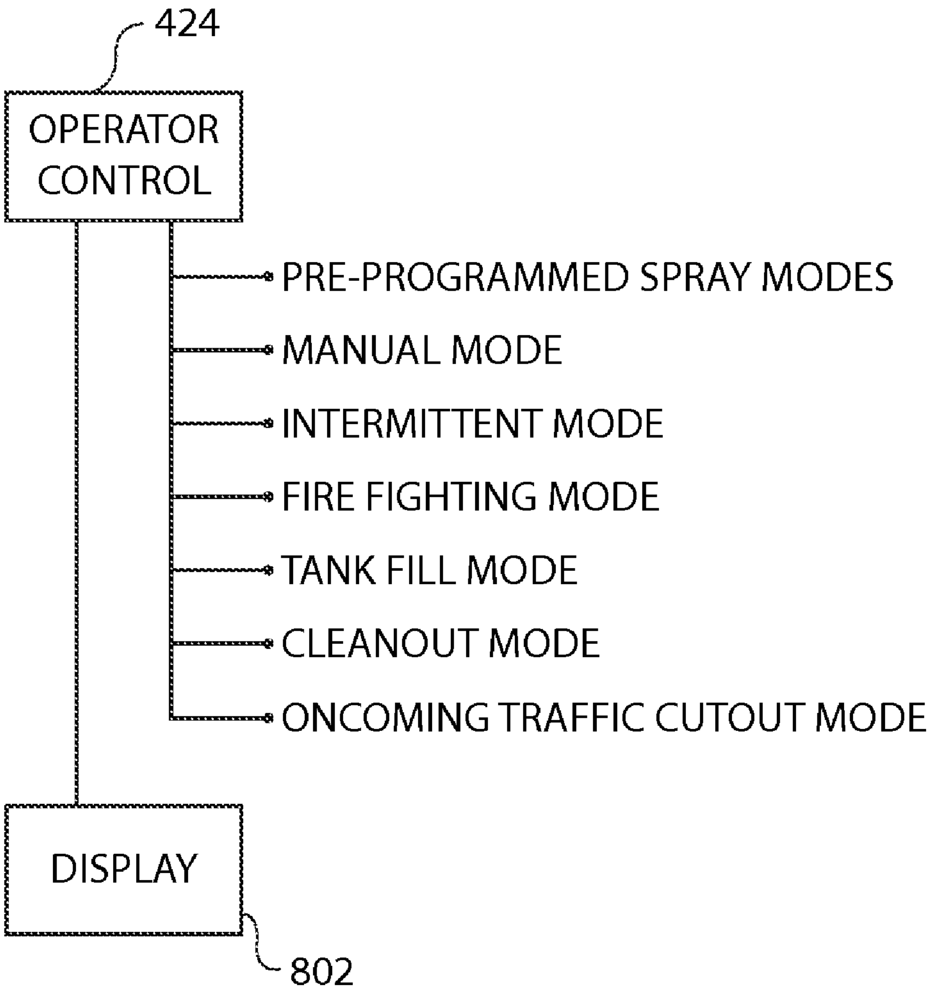
FIG. 8 is a diagrammatic representation of an operator control suited for use with the present disclosure.

Referring to FIG. 8, the operator control 424 may include a display 802. The display 802 may be used to provide visual indication of a wide variety of information including, but not limited to, a current operating mode of the fluid distribution system 100, various sensed and determined parameters (such as engine and ground speeds, fluid pressures, and the like) fluid levels in the fluid tank 430, and any other information desired to be provided. The display 802 may include visual display of information and may also include audible alerts such as low levels of fluid in the fluid tank 430, and the like.

Various operating modes may be selected from the operator control 424 through the use of a wide variety of operator input devices (not shown) which may include, but are not limited to, switches, dials, levers, joysticks, buttons, and the like. FIG. 8 lists a sampling of available modes in no particular order. The list is not meant to be all-inclusive and additional modes may be made available as desired.

Pre-programmed spray modes may allow an operator to select from among a variety of spray modes based on the intended application. It may also be a feature that additional modes may be programmed for later use.

Manual mode may allow an operator to set up desired parameters, for example selecting a desired pressure, flow rate, number of active spray heads, spray pattern, and the like.

Intermittent mode may allow an operator to select a pulsing spray pattern that may be adjusted as a function of time or spray distance.

Fire fighting mode may allow the fluid to be diverted to a spray cannon (not shown), hose reel (not shown), and/or to any combination of spray heads 200.

Tank fill mode may enable pumps and valves needed to pump fluid into the fluid tank 430. Tank fill mode may be set up to be automatic, semi-automatic, or manual. Alternatively to pumping fluid into the fluid tank 430, tank fill mode may provide for filling of the fluid tank 430 by gravity or external pumping means.

Cleanout mode may be used to open each orifice 308 to a maximum open position to flush debris from the spray heads 200. This feature may be particularly useful, for example, when a water truck obtains water from a pond or stream, thus introducing sediment, debris and particles into the fluid tank 430.

Oncoming traffic cutout mode may be used to quickly and easily shut off specific spray heads 200 that otherwise would undesirably direct spray onto objects, such as other vehicles passing the mobile machine 102. This feature may be needed for a short duration only, and thus may be controlled by use of a momentary contact switch or trigger.

Figure 5A:
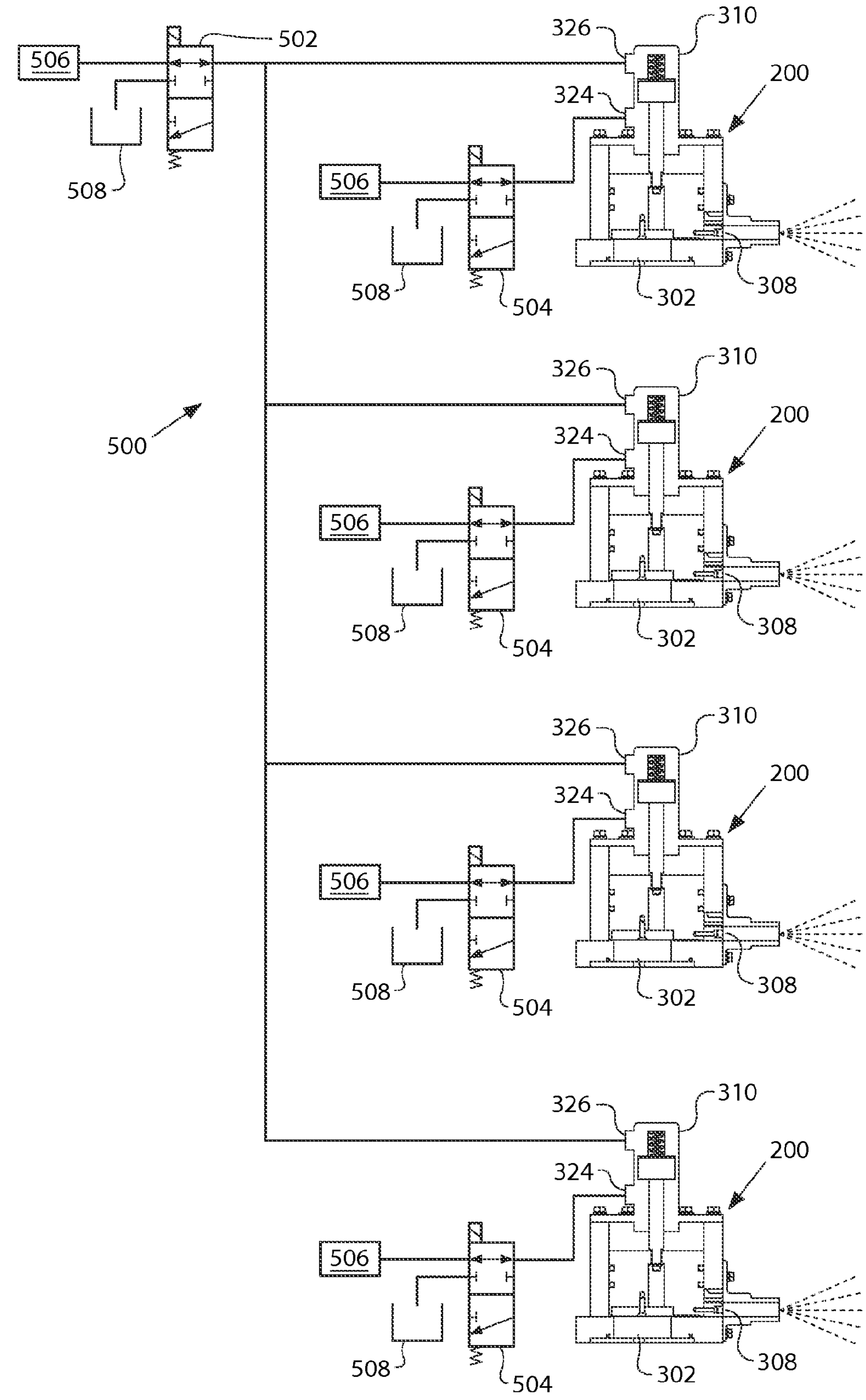
FIGS. 5A and 5B are representative diagrams of a hydraulic system suited for use with the fluid distribution system of FIG. 4.
Figure 5B:
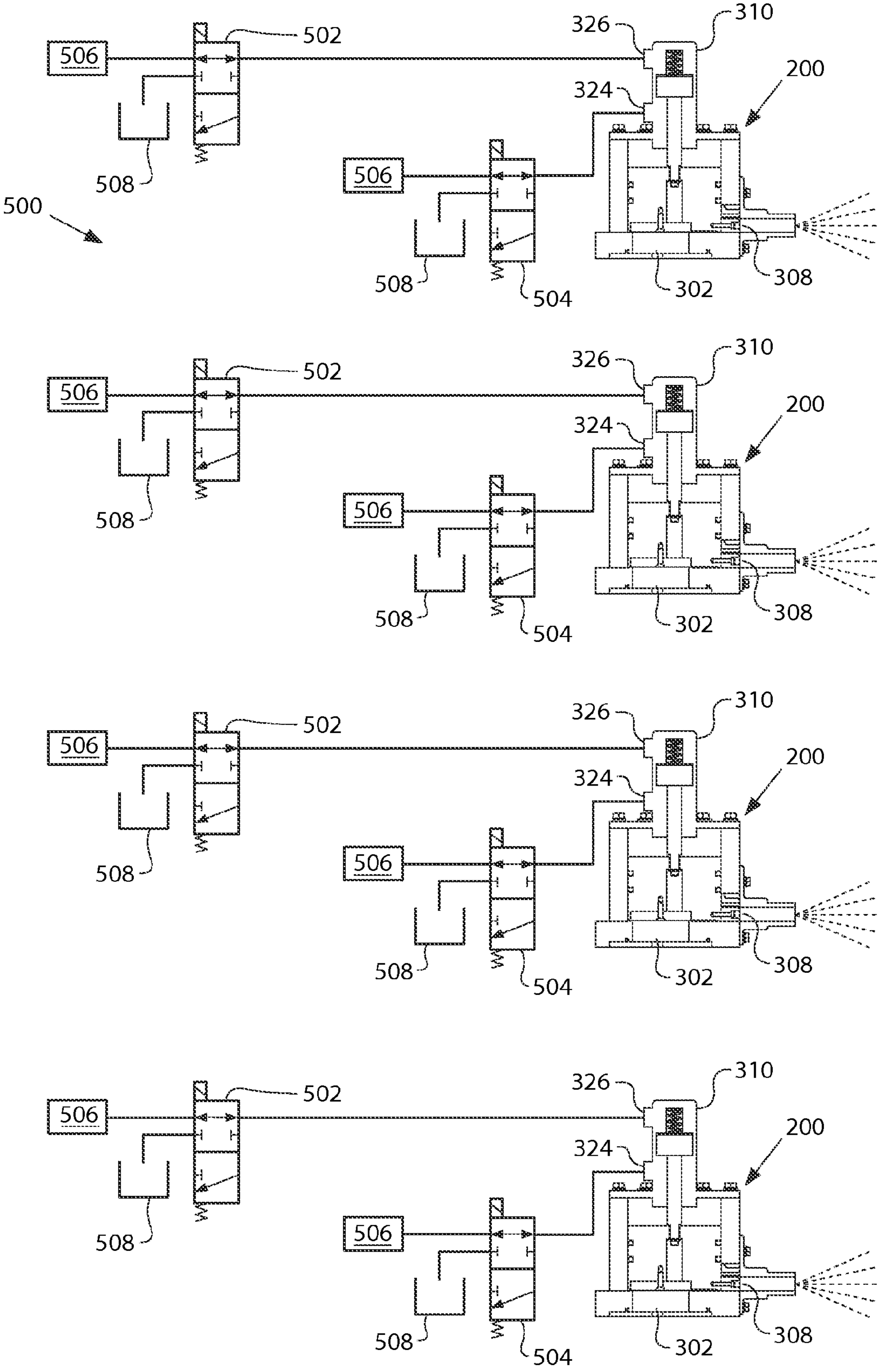

Referring to FIGS. 5A and 5B, various embodiments of a hydraulic system 500 suited to control a portion of the fluid distribution system 100 is shown. The hydraulic system 500 is representative only and is not meant to be limiting in scope and application. For illustrative purposes only, four spray heads 200 are shown.

Each hydraulic cylinder 310 may be double acting, i.e., each hydraulic piston 316 is controlled at both a head end 318 and a rod end 320. A head end valve 502, hydraulically connected to the second hydraulic port 326, is controlled to apply pressure to the head end 318, thus driving the orifice 308 toward a closed position. A rod end valve 504, hydraulically connected to the first hydraulic port 324, is controlled to apply pressure to the rod end 320, thus driving the orifice 308 toward an open position.

FIG. 5A depicts one head end valve 502 controlling all spray heads 200 simultaneously, and one rod end valve 504 controlling each spray head 200 individually. In this configuration, the single head end valve 502 applies pressure to all spray heads 200 toward a closed position, and each rod end valve 504 is independently controlled to apply pressure to a corresponding spray head 200 toward an open position. Other configurations may be used, however, without deviating from the scope of the present disclosure. For example, as depicted in FIG. 5B, multiple head end valves 502 may be used to control a corresponding number of spray heads 200 individually.

A hydraulic supply 506 and a hydraulic tank 508 supply hydraulic fluid to and from the head end and rod end valves 502,504. Although the hydraulic supply 506 and hydraulic tank 508 are shown as separate units for each valve (for ease of illustration), it is contemplated that one hydraulic supply 506 provides pressurized hydraulic fluid to all of the valves 502,504, and one hydraulic tank 508 provides a return to tank path for all of the valves 502,504. The hydraulic supply 506 may be a dedicated supply, e.g., a pilot supply, located on the mobile machine 102, or may be part of a larger hydraulic system which may include the pump 410. In like manner, the hydraulic tank 508 may be a separate tank or may be associated with the hydraulic tank 428.

Industrial Applicability

An example of application of the present disclosure can be described with reference to the flow diagrams of FIGS. 6 and 7.

Figure 6:
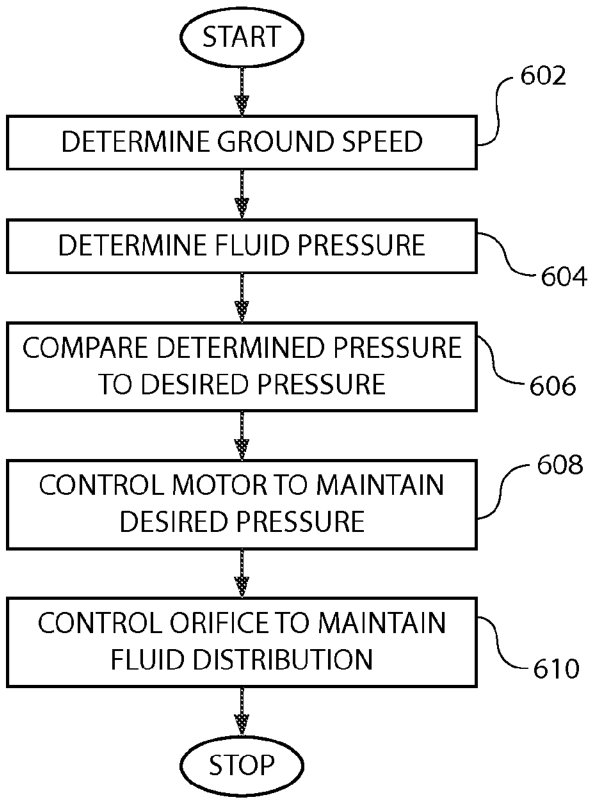
FIG. 6 is a flow diagram depicting a method of the present disclosure.

Referring to FIG. 6, in a first control block 602, a ground speed of the mobile machine 102 is determined. The ground speed may be sensed directly, for example by a ground speed sensor 414, or may be determined by other means known in the art.

In a second control block 604, a fluid pressure of the fluid lines 432 is determined. The fluid pressure may be sensed directly, for example by a fluid pressure sensor 416, or may be determined by other means known in the art. The fluid pressure may be determined from the fluid lines 432 directly, or may be determined at some other location associated with the fluid lines 432, such as the spray head 200, the fluid pump 426, the pump 410, the motor 412, or some other location. The fluid pressure may also be determined at multiple locations.

In a third control block 606, the determined fluid pressure is compared to a desired fluid pressure. The desired fluid pressure may be set based on a pre-programmed spray mode, a manually input desired fluid pressure, by some other operating mode of the fluid distribution system 100, or by some other determined or input parameter.

In a fourth control block 608, the motor 412 is controlled to maintain the determined fluid pressure at the desired fluid pressure. The motor 412 may be a variable displacement motor 412, which may be controlled by varying the displacement of the motor 412, as is well known in the art. Alternatively, the pump 410 may be a variable displacement pump 410 that may be controlled for the same purpose. Other types of controllable pumps and motors, such as electric and such, may also be used to control the fluid pressure. As an alternative to controllable pumps and/or motors, other means known in the art, such as variable orifices, valves, and the like, may be used to maintain the fluid pressure as well.

In a fifth control block 610, each variable orifice 308 is controlled to maintain a desired distribution of fluid. In a fluid distribution system 100 having multiple spray heads 200, and thus a corresponding multiple of orifices 308, each variable orifice 308 may be controlled independent of each other variable orifice 308, and all orifices 308 may be controlled independent of fluid pressure. The variable orifices 308 may be controlled to maintain a desired fluid distribution, for example a desired fluid distribution per unit of area. Control of the variable orifices 308 may be accomplished by controllably opening and closing each orifice in a manner described above with reference to FIG. 3. Opening and closing an orifice 308 is a variable process, thus providing a continuously variable number of orifice positions for optimal control of the distribution of fluid.

Figure 7:
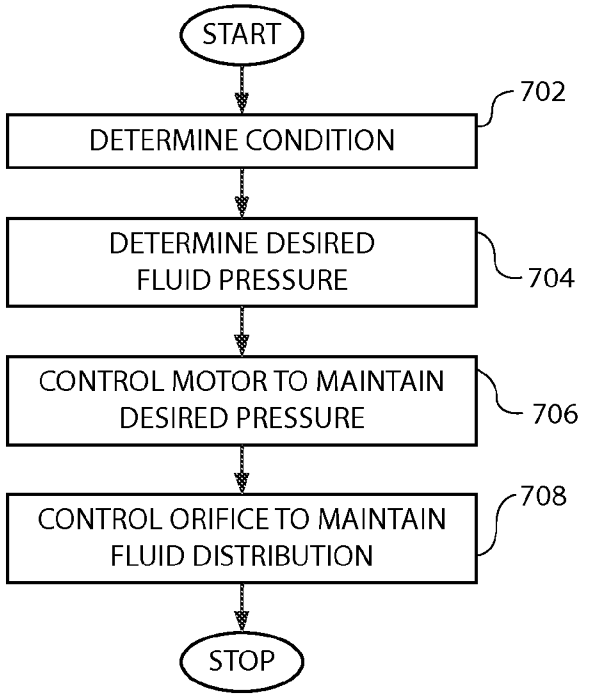
FIG. 7 is a flow diagram depicting another method of the present disclosure.

Referring to FIG. 7, a flow chart depicting another method of the present disclosure is shown.

In a first control block 702, a condition associated with a location for fluid distribution is determined. Although a number of conditions may be determined, for illustrative purposes an exemplary condition of a level of dryness associated with the location is described. The level of dryness may be determined, for example in a water truck application, by an operator's observations of a relative dryness of the roads and surfaces to be sprayed. Alternatively, other more automated means for determining a level of dryness may be used.

In a second control block 704, a desired fluid pressure as a function of the determined condition is determined. The desired fluid pressure may be a modification of the desired fluid pressure associated with the method described with reference to FIG. 6.

In a third control block 706, the motor 412 is controlled to maintain the desired fluid pressure, in the same manner as described above with reference to FIG. 6.

In a fourth control block 708, the variable orifice 308 is controlled as a function of both the ground speed and the determined condition to maintain the desired distribution of fluid.

The present disclosure provides a mobile fluid distribution system 100 and method which offers many advantages, among which includes providing control of fluid distribution over a desired area, in particular control of an amount of fluid distributed over a desired unit of area under varying conditions. Maintaining a constant fluid pressure while varying the flow rate through individual spray heads 200 provides more precise control of fluid distribution and the capability for a number of specialized flow control modes.

Other aspects can be obtained from a study of the drawings, the specification, and the appended claims.

What is claimed is:

1. A fluid distribution system, comprising:

a power source;

a pump driven by the power source;

a motor driven by the pump; and a spray head configured to receive fluid from a fluid source driven by the motor, the spray head including;

a fluid inlet passage;

a fluid outlet passage;

a fluid piston disposed in a chamber for controlled access between the inlet and outlet passages and defining a variable orifice; and a double acting hydraulic cylinder connected to the fluid piston and configured to control movement of the fluid piston to vary a size of the orifice, thereby varying a flow rate of fluid output from the outlet passage;

wherein the fluid piston and the hydraulic cylinder are aligned with a common longitudinal axis, and the inlet passage is offset from the axis in a direction opposed to the location of the outlet passage.

2. A fluid distribution system, as set forth in claim 1, wherein the motor is a variable displacement motor, and a displacement of the motor is controllable to adjust a pressure of fluid delivered to the spray head.

3. A fluid distribution system, as set forth in claim 2, further comprising:

a ground speed sensor configured to sense a ground speed of the fluid distribution system;

a fluid pressure sensor configured to sense a pressure of fluid delivered to the spray head; and a controller connected to the ground speed sensor and the fluid pressure sensor, the controller being configured to:

receive the sensed ground speed and the sensed pressure, control the displacement of the motor, and control operation of the double acting hydraulic cylinder to vary the size of the orifice.

4. A fluid distribution system, as set forth in claim 3, wherein the spray head includes a plurality of independently controllable spray heads.

5. A fluid distribution system, as set forth in claim 1, wherein the variable orifice is a continuously variable orifice.

6. A fluid distribution system, as set forth in claim 1, wherein the power source includes a prime mover for a mobile machine.

7. A fluid distribution system, as set forth in claim 6, wherein the prime mover includes an engine drivingly connected to the mobile machine and a transmission driven by the engine.

8. A fluid distribution system, as set forth in claim 7, wherein the pump is a hydraulic pump driven by one of the engine and the transmission.

9. A method for distributing a fluid, the method comprising the steps of:

determining a ground speed of a mobile machine configured for fluid distribution;

determining a pressure of fluid being delivered to a spray head having a variable orifice, the spray head comprising a double acting hydraulic cylinder;

comparing the determined pressure to a desired fluid pressure;

controlling a variable displacement motor to maintain the desired fluid pressure based on the comparison; and controlling a size of the variable orifice during operation as a function of the ground speed and independent of fluid pressure to vary a flow rate of fluid output from the spray head to maintain a desired distribution of fluid.

10. A method, as set forth in claim 9, wherein controlling the size of the variable orifice includes the step of controlling sizes of a plurality of orifices on a corresponding plurality of spray heads.

11. A method, as set forth in claim 10, wherein controlling sizes of a plurality of orifices includes the step of controlling the sizes of the plurality of orifices independent of each other.

12. A method, as set forth in claim 9, further including the steps of:

determining a condition associated with a location for fluid distribution;

determining a desired fluid pressure as a function of the condition;

controlling the variable displacement motor to maintain the desired fluid pressure; and controlling the variable orifice as a function of the ground speed and as a further function of the determined condition to maintain the desired distribution of fluid.

13. A method, as set forth in claim 12, wherein determining a condition includes the step of determining a level of dryness associated with the location.

14. A spray head for a fluid distribution system, comprising:

a fluid inlet passage;

a fluid outlet passage;

a fluid piston disposed in a chamber for controlled access between the inlet and outlet passages and defining a variable orifice; and a double acting hydraulic cylinder connected to the fluid piston and configured to control movement of the fluid piston to vary a size of the orifice, thereby varying a flow rate of fluid output from the outlet passage;

wherein the fluid piston and the hydraulic cylinder are configured to move along a central longitudinal axis, and the inlet passage is offset from the axis in a direction opposed to the location of the outlet passage.

15. A spray head, as set forth in claim 14, further including at least one fluid deflector connected to the spray head and configured to control a fluid distribution pattern from the outlet passage.

16. A spray head, as set forth in claim 15, wherein the at least one fluid deflector is configured to control a laminar fluid distribution pattern from the outlet passage.

17. A spray head, as set forth in claim 14, wherein the hydraulic cylinder includes:

a hydraulic piston having a head end and a rod end;

a rod connecting the hydraulic piston to the fluid piston;

a first hydraulic port positioned to allow hydraulic fluid in the hydraulic cylinder at the rod end; and a second hydraulic port positioned to allow hydraulic fluid in the hydraulic cylinder at the head end.

18. A spray head, as set forth in claim 17, wherein the hydraulic cylinder further includes a spring disposed in the hydraulic cylinder at the head end.

19. A spray head, as set forth in claim 14, wherein the hydraulic cylinder is fluidically isolated from the chamber.

20. The spray head, as set forth in claim 14, wherein the fluid piston is movable to adjust a degree of opening of the variable orifice.

21. The fluid distribution system of claim 1, wherein the spray head includes a housing defining the inlet passage, the outlet passage, and the chamber in which the fluid piston is disposed.

22. The fluid distribution system of claim 1, wherein the inlet passage is generally parallel to the axis and the outlet passage is generally perpendicular to the inlet passage.

23. The fluid distribution system of claim 1, wherein the pump is a variable displacement pump, and a displacement of the pump is controllable to adjust a pressure of fluid delivered to the spray head.

24. The fluid distribution system of claim 1, wherein:

the pump is a variable displacement pump;

the motor is a variable displacement motor; and displacements of the pump and the motor are controllable to adjust a pressure of fluid delivered to the spray head.

25. The method of claim 9, further comprising controlling movement of a fluid piston of the spray head to control the size of the variable orifice, the fluid piston providing controlled access between a fluid inlet passage and a fluid outlet passage of the spray head.

26. The fluid distribution system of claim 16, wherein the at least one fluid deflector includes an opening through which flow from the outlet passage passes, and the opening of the at least one fluid deflector is at least as large as the size of the orifice.

* * * * *